United States Patent
Tokoi et al.

(10) Patent No.: US 9,935,510 B2
(45) Date of Patent: Apr. 3, 2018

(54) AXIAL-TYPE ROTARY ELECTRIC MACHINE

(71) Applicant: Hitachi Industrial Equipment Systems Co., Ltd., Chiyoda-ku, Tokyo (JP)

(72) Inventors: Hirooki Tokoi, Tokyo (JP); Yuji Enomoto, Tokyo (JP); Toshifumi Suzuki, Tokyo (JP); Shuichi Takahashi, Tokyo (JP); Kenichi Souma, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 194 days.

(21) Appl. No.: 14/780,658

(22) PCT Filed: Jan. 22, 2014

(86) PCT No.: PCT/JP2014/051193
§ 371 (c)(1),
(2) Date: Sep. 28, 2015

(87) PCT Pub. No.: WO2014/208110
PCT Pub. Date: Dec. 31, 2014

(65) Prior Publication Data
US 2016/0065020 A1    Mar. 3, 2016

(30) Foreign Application Priority Data
Jun. 28, 2013    (JP) .................................. 2013-135747

(51) Int. Cl.
*H02K 1/02*    (2006.01)
*H02K 1/27*    (2006.01)
*H02K 21/24*    (2006.01)

(52) U.S. Cl.
CPC .............. *H02K 1/2793* (2013.01); *H02K 1/02* (2013.01); *H02K 21/24* (2013.01); *H02K 2213/03* (2013.01)

(58) Field of Classification Search
CPC .......... H02K 1/2793; H02K 1/02; H02K 1/24; H02K 2213/03; H02K 1/278
(Continued)

(56) References Cited

U.S. PATENT DOCUMENTS 3,845,339 A * 10/1974 Merkle .................... H02K 3/46
                                                        310/156.34
4,187,441 A *  2/1980 Oney ..................... H02K 16/00
                                                        310/112
(Continued)

FOREIGN PATENT DOCUMENTS

CN    202957727    *  5/2013
GB       968081       8/1964
(Continued)

OTHER PUBLICATIONS

European Search Report issued in counterpart European Application No. 14817066.5 dated Feb. 28, 2017 (seven (7) pages).
(Continued)

*Primary Examiner* — Bernard Rojas
*Assistant Examiner* — Ahmed Elnakib
(74) *Attorney, Agent, or Firm* — Crowell & Moring LLP (57) ABSTRACT

An axial-type rotary electric machine that improves a torque and an efficiency relative to a size of a rotor is provided. The axial-type rotary electric machine is provided with a stator having a stator core, and a rotor facing the stator along an axial direction of a rotation axis passing through the stator. The rotor includes a permanent magnet arranged so as to face the stator core in the axial direction of the rotation axis, a yoke arranged so as to face the stator core across the (Continued)

permanent magnet, and a support member supporting the yoke. The support member includes a protrusion protruding so as to face a side surface of the permanent magnet that is on the farther side to the rotation axis. In projection along the axial direction of the rotation axis, a first region where a projecting portion of the permanent magnet does not overlap a projecting portion of the yoke is formed in the permanent magnet, and the first region is formed on the outer-diameter side of the permanent magnet and the first region is formed on a side of the protrusion.

7 Claims, 10 Drawing Sheets

(58) Field of Classification Search
USPC .... 310/156.08, 156.12, 156.32, 268, 154.05, 310/216.013, 49.42, 49.22, 49.32, 266; 29/598
See application file for complete search history.

(56) References Cited

U.S. PATENT DOCUMENTS

| | | | |
|---|---|---|---|
| 4,443,906 A * | 4/1984 | Tucker | A47L 11/03 15/50.1 |
| 4,851,731 A * | 7/1989 | Saotome | G11B 19/20 310/156.32 |
| 6,720,688 B1 | 4/2004 | Schiller | |
| 7,960,884 B2 | 6/2011 | Miyata et al. | |
| 8,058,762 B2 | 11/2011 | Asano | |
| 2009/0273252 A1 | 11/2009 | Nakamasu et al. | |
| 2010/0072850 A1* | 3/2010 | Miyata | H02K 1/2793 310/156.12 |
| 2010/0148611 A1 | 6/2010 | Wang et al. | |
| 2012/0217831 A1 | 8/2012 | Jore et al. | |

FOREIGN PATENT DOCUMENTS

| | | |
|---|---|---|
| JP | 60-77659 A | 5/1985 |
| JP | 8-37766 A | 2/1996 |
| JP | 9-200987 A | 7/1997 |
| JP | 2002-34214 A | 1/2002 |
| JP | 2007-202363 A | 8/2007 |
| JP | 2007-267599 A | 10/2007 |
| JP | 2008-22663 A | 1/2008 |
| JP | 2009-33946 A | 2/2009 |
| JP | 2009-131087 A | 6/2009 |
| JP | 2009-268196 A | 11/2009 |
| JP | 2010-4635 A | 1/2010 |
| JP | 2010-115069 A | 5/2010 |

OTHER PUBLICATIONS

International Search Report dated Apr. 28, 2014 with English translation (Four (4) pages).

* cited by examiner

AXIAL-TYPE ROTARY ELECTRIC MACHINE

TECHNICAL FIELD

The present invention relates to an axial-type rotary electric machine that can improve a torque and efficiency relative to a size of a rotor.

BACKGROUND ART

In recent years, an axial-type rotary electric machine has been paid attention. The present axial-type rotary electric machine has a structure in which a disc-shaped rotor and a stator are arranged so as to face each other, and the structure is advantageous for achieving a thin and flat rotary electric machine. Also, the present axial-type rotary electric machine can be configured as a double-rotor type having a stator sandwiched by two rotors in an axial direction. A general double-rotor type rotary electric machine has a configuration in which a plurality of independent cores each wound with a winding wire is circumferentially arranged and which is provided with a stator molded with a resin and a rotor obtained by connecting a yoke to a plurality of circumferentially-arranged permanent magnets. A torque of a motor is proportional to a gap area which is a facing surface between the rotor and the stator, and the double-rotor type rotary electric machine allows increase in the gap area per body, and therefore, is effective for achieving high output power and high efficiency. Further, the inventors consider that the double-rotor type is an effective structure for application to an amorphous metal having a feature of low loss. Because of hard and fragile, the amorphous metal is difficult to be processed. In the double-rotor type rotary electric machine, a core can be configured with an extremely simple shape such as a substantially rectangular parallelepiped shape by preparing the stator core as an open slot. Therefore, the amorphous metal can be processed into a core shape by a simple method.

In order to improve the torque and efficiency of the axial-type rotary electric machine, it is effective to expand its diameter to increase an area (hereinafter "gap area") at which the stator and the rotor face to each other. However, this manner requires a caution because a centrifugal force acting on the rotor increases. Particularly, since the axial-type rotary electric machine has a surface-magnet configuration in which a permanent magnet is arranged on a surface of the rotor in many cases, the axial-type rotary electric machine has a problem of scattering and a breakage of the magnet due to the centrifugal force.

A prior art example of the rotor structure of the axial-type rotary electric machine will be described below.

A rotor described in Patent Documents 1 and 2 is configured by a permanent magnet, a yoke, and a support member used for supporting them and fixing them to a shaft. A protrusion which covers the outer peripheral surface of the permanent magnet is provided on the outer diameter side of the support member so as to improve strength against the centrifugal force. Such a rotor structure is commonly observed even in other inventions related to the axial-type rotary electric machine.

PRIOR ART DOCUMENTS

Patent Documents

Patent Document 1: Japanese Patent Application Laid-Open Publication No. 2009-131087

Patent Document 2: Japanese Patent Application Laid-Open Publication No. 2007-202363

SUMMARY OF THE INVENTION

Problems to be Solved by the Invention

When it is tried improve the strength against the centrifugal force in the rotor structure of the general axial-type rotary electric machine representatively described in Patent Documents 1 and 2, it is required to thicken the protrusion of the support member in a radial direction, and therefore, the outer diameter of the rotor adversely increases. In general, on the outer periphery of the rotor of the axial-type rotary electric machine, a housing, a crossover wire of a winding wire of the stator, and others are arranged. Because the outer diameter of the rotor is limited by sizes of these components, the increase in the thickness of the protrusion in the radial direction decreases the outer diameter of the permanent magnet. This manner results in decrease in the torque and the efficiency of the rotary electric machine.

Accordingly, the present invention provides a rotor that can improve a torque and an efficiency relative to a size of the rotor and provides an axial-type rotary electric machine using the rotor.

Means for Solving the Problems

In order to achieve the above-described object, the feature of the present invention is, for example, as follows.

An axial-type rotary electric machine includes: a stator having a stator core; and a rotor which faces the stator along an axial direction of a rotation axis passing through the stator, the rotor includes: a permanent magnet arranged so as to face the stator core in the axial direction of the rotation axis; a yoke arranged so as to face the stator core across the permanent magnet; and a support member supporting for the yoke, the support member includes a protrusion which protrudes so as to face a side surface of a permanent magnet on a farther side to the rotation axis. In the axial-type rotary electric machine, in projection along along the axial direction of the rotation axis, a first region where a projection portion of the permanent magnet does not overlap a projection portion of the yoke is formed in the permanent magnet, and the first region is formed on the outer-diameter side of the permanent magnet and is formed on a side portion of the protrusion.

Effects of the Invention

In a rotor and an axial-type rotary electric machine using the rotor according to the present invention, a torque and efficiency relative to a size of the rotor can be improved. A problem, a configuration, and an effect other than those described above will be described clearly through the following explanation of embodiments.

BEST MODE FOR CARRYING OUT THE INVENTION

Hereinafter, embodiments of the present invention will be described with reference to drawings. The embodiments can be variously modified and altered by those who skilled in the art within the scope of a technical concept disclosed in the present specification. Also, in all the drawings for description of the present invention, the same function is denoted by the same reference symbol, and the repetitive description thereof is omitted in some cases.

Figure 6A:
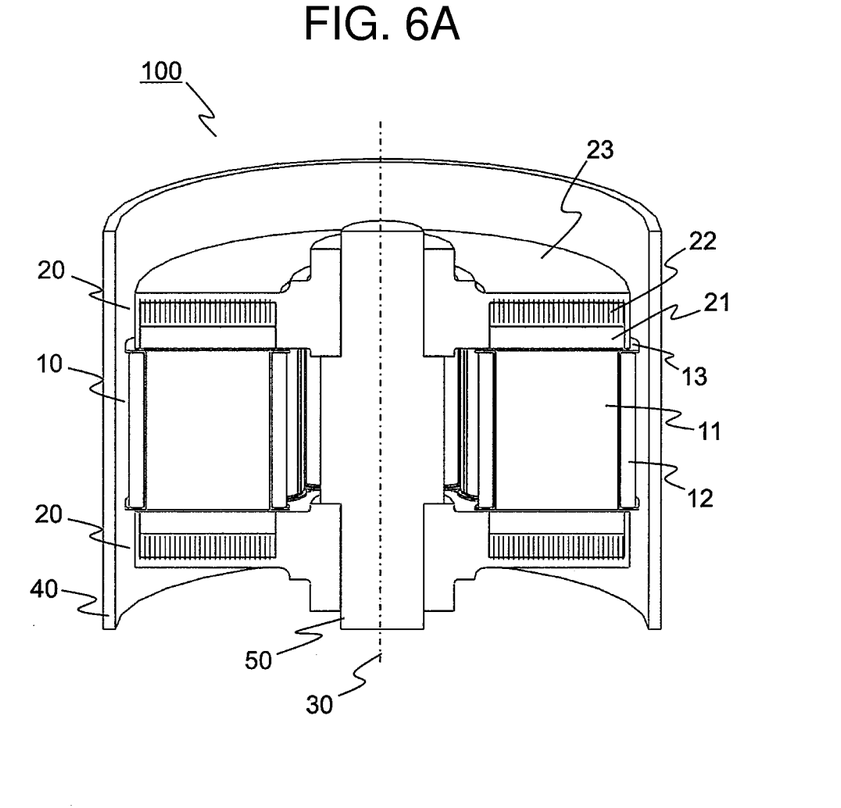
FIG. 6A is a perspective cross-sectional view of a conventional axial-type rotary electric machine.
Figure 6B:
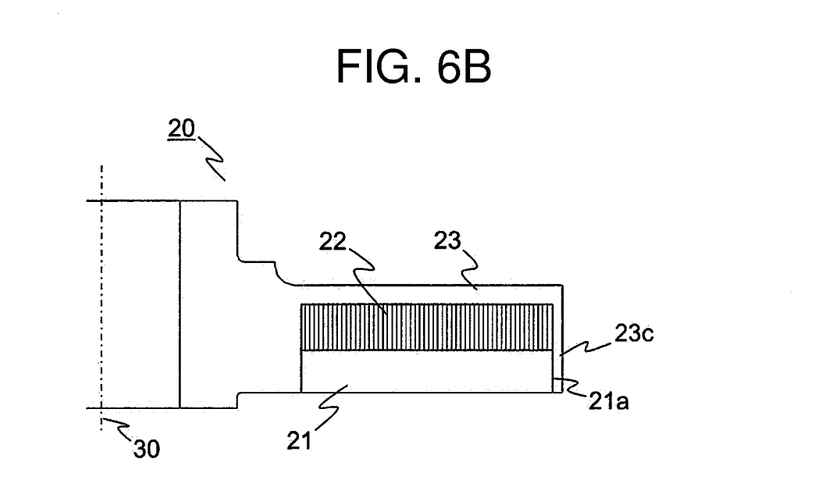
FIG. 6B is an enlarged cross-sectional view of a conventional rotor.

FIG. 6(a) is a perspective cross-sectional view of a conventional axial-type rotary electric machine, and FIG. 6(b) is an enlarged cross-sectional view of a conventional rotor. The explanation for the reference symbols in FIGS. 6(a) and 6(b) will be described in the following embodiments.

In FIG. 6(b), when a permanent magnet 21 is projected along the axial direction of a rotation axis 30, a projection 21b of the permanent magnet 21 matches a projection 22b of the yoke 22 in the permanent magnet 21, and therefore, it is difficult to reduce a radial thickness of a protrusion 23c used for holding the permanent magnet 21.

First Embodiment

Figure 1A:
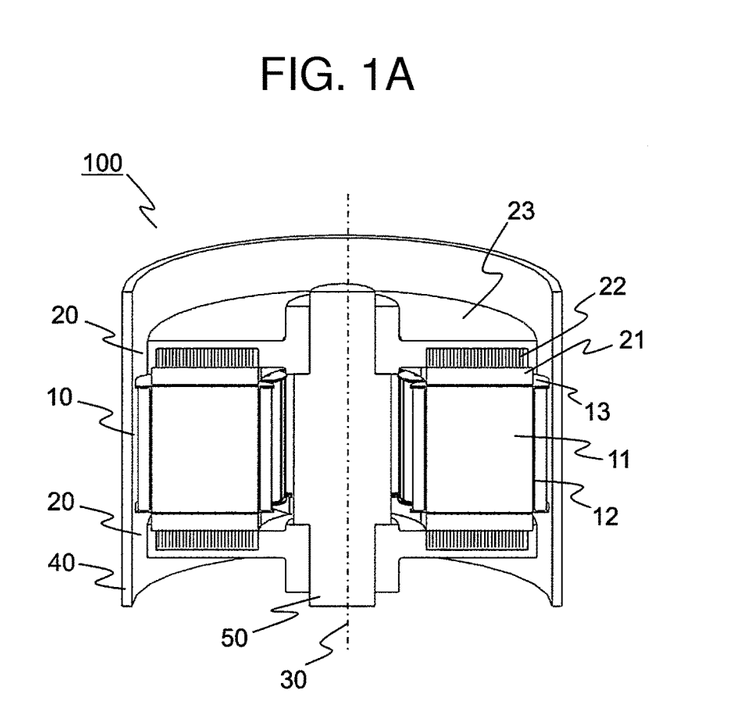
FIG. 1A is a perspective cross-sectional view of an axial-type rotary electric machine according to a first embodiment.
Figure 1B:
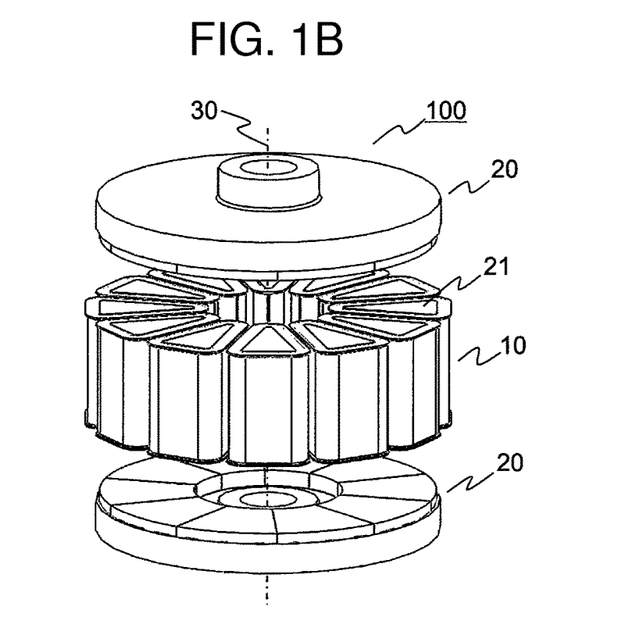
FIG. 1B is a perspective view of the axial-type rotary electric machine according to the first embodiment.

FIGS. 1(a) to 1(e) are views for explaining an example of application of the present invention to a double-rotor axial-type motor having one stator and two rotors. FIG. 1(a) is a perspective cross-sectional view of a motor (axial-type rotary electric machine 100) according to the present embodiment, and FIG. 1(b) is a perspective view of the axial-type rotary electric machine according to the present embodiment.

The axial-type rotary electric machine 100 of FIG. 1(a) includes: a stator 10; rotors 20 arranged so as to sandwich the stator 10 via an air gap in a direction of a rotation axis 30 passing through the stator 10; a housing 40 used for holding the stator 10; and a shaft 50 used for holding the rotors 20 via bearings not shown. The rotors 20 face the stator 10 along the axial direction of the rotation axis 30.

In FIG. 1(b), illustration of the housing 40 and the shaft 50 is omitted. Also, the air gap is shown so as to be enlarged in order to understand the structure of the stator 10. The stator 10 includes: a plurality of circumferentially-arranged soft magnetic stator cores 11; a winding wire 12 wound around the stator cores 11; and a bobbin 13 electrically insulating the stator cores 11 from the winding wire 12. The stator cores 11, the winding wire 12, and the bobbin 13 are molded integrally with the housing 40 by using a resin. The rotor 20 is configured of the permanent magnet 21 arranged so as to face an end surface of each stator core 11 in the axial direction, a soft magnetic yoke 22 arranged on the back of the permanent magnet 21, and a support member 23 used for holding the permanent magnet 21 and the yoke 22 on the shaft 50 so as to support the yoke 22. The yoke 22 is arranged so as to face the stator core 11 across the permanent magnet 21. The support member 23 is fixed to the rotation axis 30.

Figure 1C:
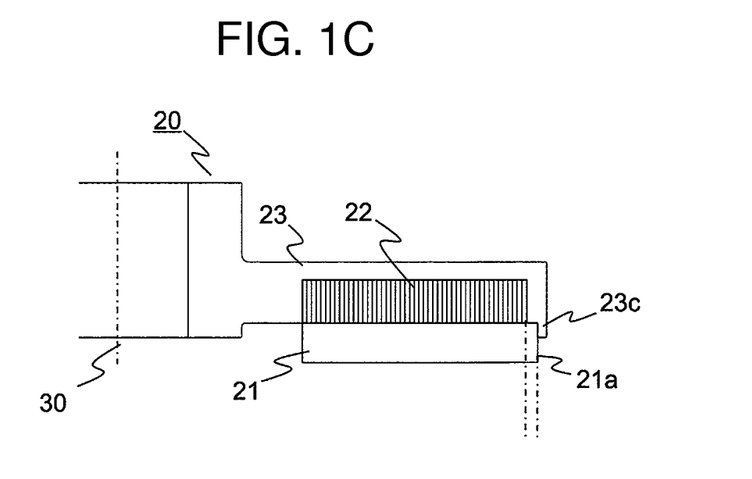
FIG. 1C is an enlarged cross-sectional view of a rotor according to the first embodiment.
Figure 1D:
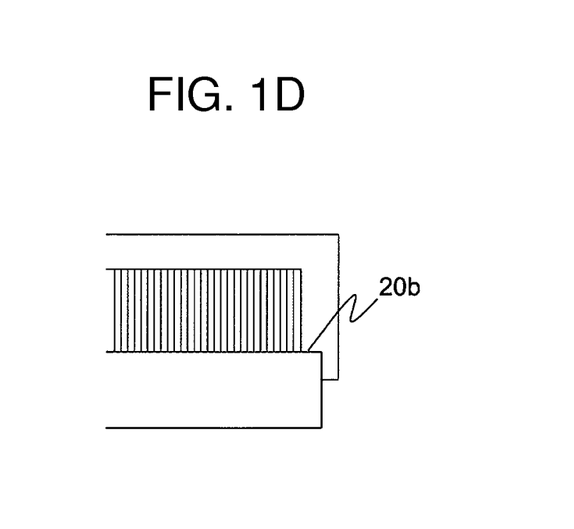
FIG. 1D is an enlarged cross-sectional view of a protrusion of a support member according to the first embodiment.

FIG. 1(c) shows an enlarged cross-sectional view of the rotor according to the present embodiment, and FIG. 1(d) shows an enlarged cross-sectional view of a protrusion of the support member according to the present embodiment. The support member 23 has the protrusion 23c protruding so as to face a side surface 21a of a permanent magnet 21 arranged on the farther side to the rotation axis 30.

Figure 1E:
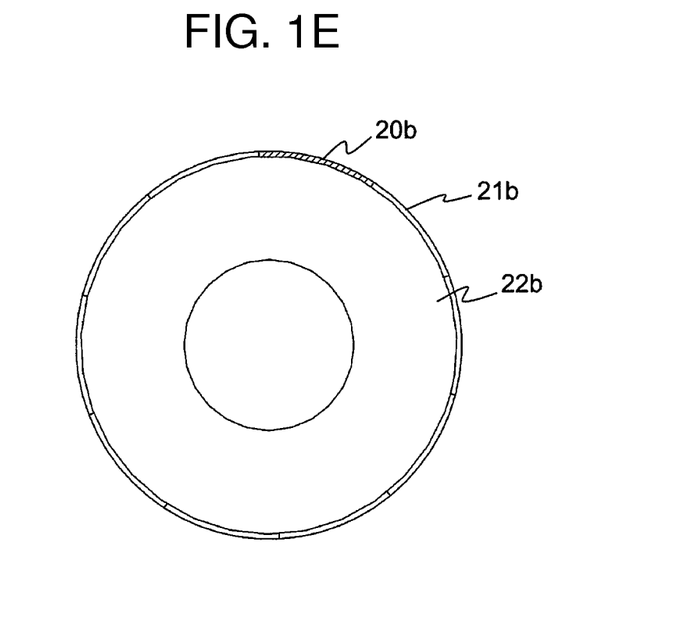
FIG. 1E is a view of a permanent magnet and a yoke according to the first embodiment when seen in an axial direction of a rotation axis.

FIG. 1(e) shows a view of the permanent magnet and the yoke when seen in the axial direction of the rotation axis. An outer diameter of the permanent magnet 21 is larger than an outer diameter of the yoke 22 so as to have a first region 20b not overlapped with the yoke 22. In other words, when the permanent magnet 21 is projected along the axial direction of the rotation axis 30, the first region 20b where the projection 21b of the permanent magnet 21 does not overlap the projection 22b of the yoke 22 is formed in the permanent magnet 21. The first region 20b is formed on the outer-diameter side of the permanent magnet 21. The permanent magnet 21 is arranged so that the first region 20b is formed on a side of the protrusion 23c.

The operation of the axial-type motor of the present embodiment will be described. Here, an operation example of the motor will be described. The winding wire is electrically conducted with an alternating current by using an inverter or an alternating-current power supply not shown. As a result, an alternating magnetic field is generated on the surface of the stator. This alternating magnetic field and a dielectric-current magnetic field generated by the permanent magnet attract to and repel against each other, so that the rotor is rotated so as to generate a torque. Also, by the rotation, a centrifugal force acts on the rotor outward in its radial direction.

An effect of the axial-type motor of the present embodiment will be described. In the axial-type rotary electric machine 100 of the present invention, the permanent magnet 21 and the yoke 22 are held by the protrusion 23c of the support member 23 from the outer periphery side, and therefore, the permanent magnet 21 and the yoke 22 can be suppressed from being scattered. Also, by forming the first region 20b, the radial thickness of the protrusion 23c used for holding the permanent magnet 21 can be reduced as the strength of the protrusion 23c against the centrifugal force is maintained. In this manner, the increase in the diameter of the rotor due to the protrusion 23c can be suppressed to the minimum. A ratio of the diameter of the permanent magnet 21 with respect to the diameter of the rotor 20 can be increased, and therefore, a high torque of the motor and a high efficiency thereof can be achieved. Also, the radial thickness of the protrusion 23c decreases, and therefore, a flow property of a material in casting of the support member 23 is good, and a manufacturing performance is also excellent. The support member 23 may be made of a soft magnetic material or non-magnetic material. Because the diameter of the rotor 20 can be reduced, the diameter of the housing 40 can be reduced, a crossover wire of the winding wire or others can be arranged between the outer peripheral surface of the rotor 20 and the housing 40.

In the present embodiment, an example of application of the present invention to the double-rotor axial-type motor has been described. However, the present invention may be applied to a single-rotor axial-type motor having a pair of a stator and a rotor facing each other. And, the motor may be replaced with a generator. Also, in the present embodiment, the ring-shaped permanent magnet has been described. However, the magnet may be divided. Also, the first region 20b may be formed by tapering the permanent magnet 21 by forming both diameters of contact portions of the permanent magnet 21 and the yoke 22 so as to be the same as each other.

Second Embodiment

Figure 2A:
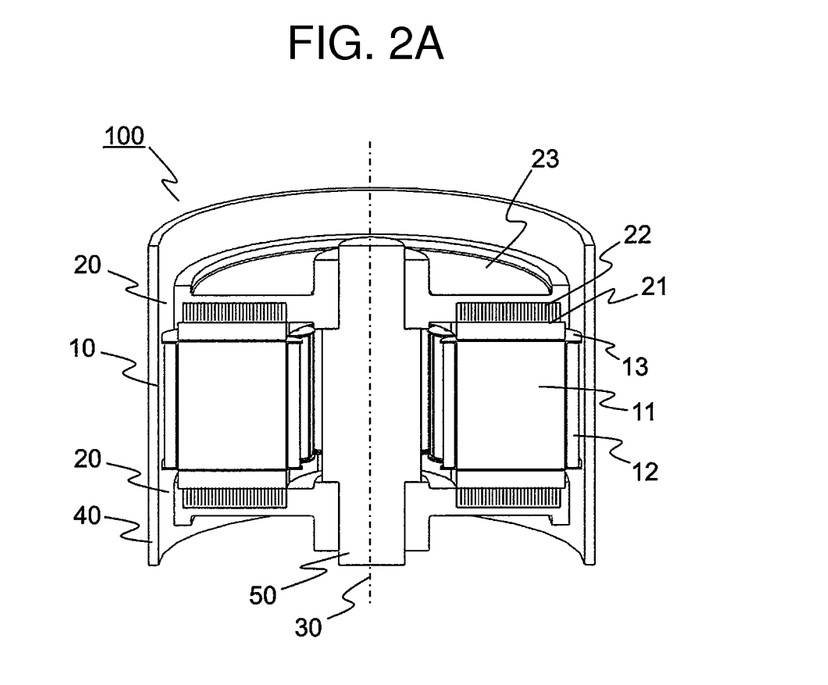
FIG. 2A is a perspective cross-sectional view of an axial-type rotary electric machine according to a second embodiment.

FIGS. 2(a) to 2(c) are views for explaining an example of application of the present invention to a double-rotor axial-type motor. A structure, an operation, and an effect overlapped with those of FIGS. 1(a) to 1(e) will be omitted. FIG. 2(a) is a perspective cross-sectional view of an axial-type rotary electric machine according to the present embodiment.

Figure 2B:
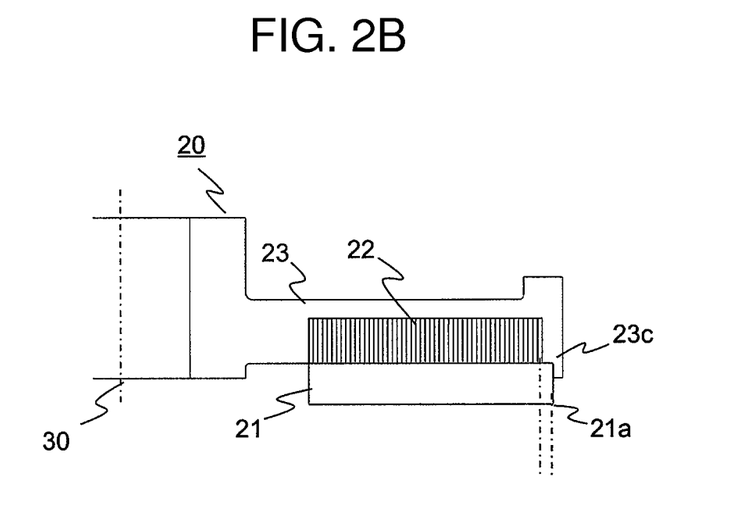
FIG. 2B is an enlarged cross-sectional view of a rotor according to the second embodiment.
Figure 2C:
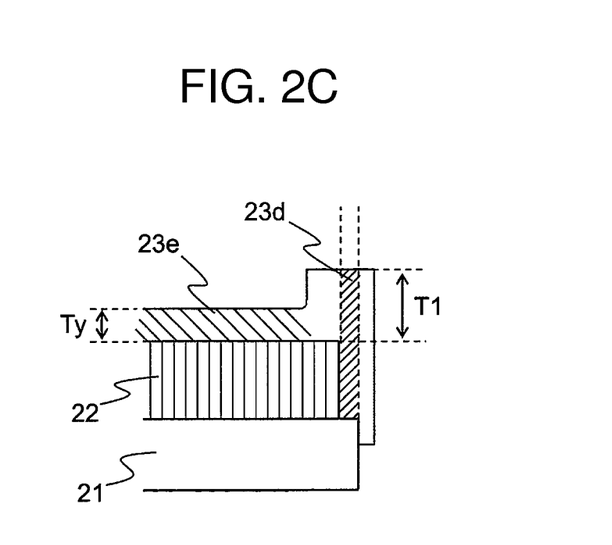
FIG. 2C is an enlarged cross-sectional view of a protrusion of a support member according to the second embodiment.

FIG. 2(b) shows an enlarged cross-sectional view of a rotor according to the present embodiment, and FIG. 2(c) shows an enlarged cross-sectional view of the protrusion of the support member according to the present embodiment. In FIG. 2(c), when a first portion 23d facing the first region 20b and a yoke facing portion 23e facing the yoke 22 are compared with each other in the thickness of the support member 23 with reference to an end surface of the yoke 22 which does not face the permanent magnet 21, the rotor 20 has a relation of "a thickness T1 of the support member 23 on the first portion 23d>a thickness Ty of the support member 23 on the yoke facing portion 23e".

An effect of the axial-type motor of the present embodiment will be described. In the axial-type motor of the second embodiment, the thickness of the support member 23 on the first portion 23d is increased, and therefore, when the support member 23 is made of a soft magnetic material, a magnetic resistance of a magnetic circuit can be reduced.

When the support member 23 is made of a non-magnetic material, magnetic flux emitted from a magnetic pole where the permanent magnet 21 exists passes through the soft magnetic yoke 22 and enters an adjacent magnetic pole. On the other hand, when the support member 23 is made of a soft magnetic material, the support member 23 also forms a magnetic circuit particularly centering on the first region 20b. Particularly when the yoke 22 is thinned in order to thin the rotor 20, a magnetic flux density of the yoke 22 increases, which results in increase in a magnetic resistance of the yoke 22, and therefore, the magnetic flux is easy to pass through the first region 20b. At this time, iron making up the support member 23 has a lower magnetic permeability and is easier to be magnetically saturated than an electromagnetic steel sheet generally making up the yoke 22. Accordingly, by thickening the support member 23 on the first portion 23d as described in the present embodiment, the amount of magnetic flux leaking out of the magnetic circuit, so that the output torque and efficiency of the motor is improved.

Further, this thickened portion can be utilized to correct the balance of the rotor 20. The axial-type motor has the rotor 20 larger in a diameter than that of a radial-type, and therefore, inertia tends to increase. In order to reduce a load on the bearing for the service life of the bearing and reduction of a mechanical loss, it is important to correct the balance. While provision of a balance correction margin is effective on the outer-diameter side, this has a possibility of increase in the diameter of the rotor 20. In the rotor structure of the present embodiment, the balance can be corrected without the increase in the diameter of the rotor 20. This effect is effective also when the support member 23 is made of a soft magnetic material.

Third Embodiment

Figure 3A:
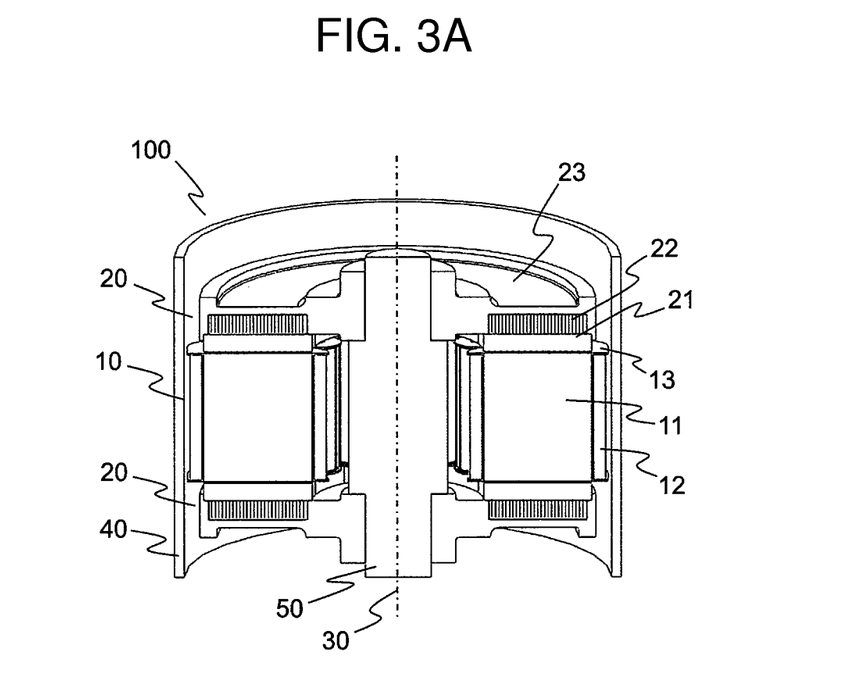
FIG. 3A is a perspective cross-sectional view of an axial-type rotary electric machine according to a third embodiment.
Figure 3B:
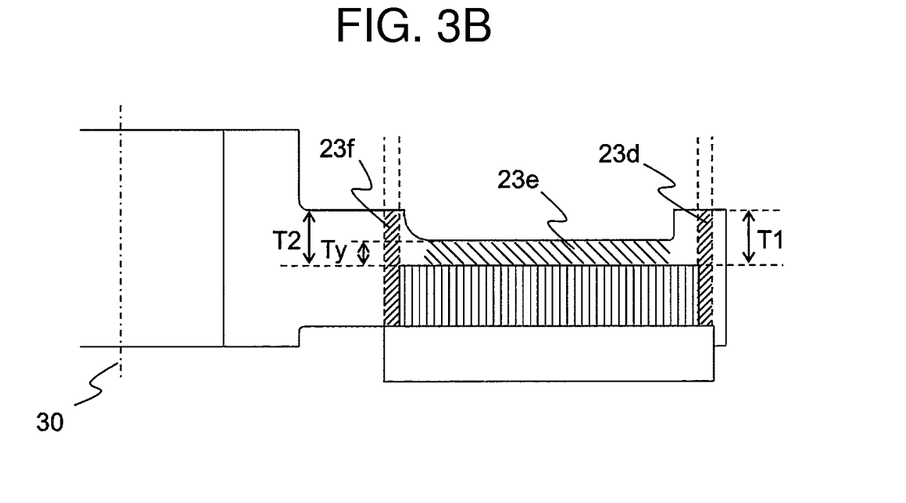
FIG. 3B is an enlarged cross-sectional view of a rotor according to the third embodiment.
Figure 3C:
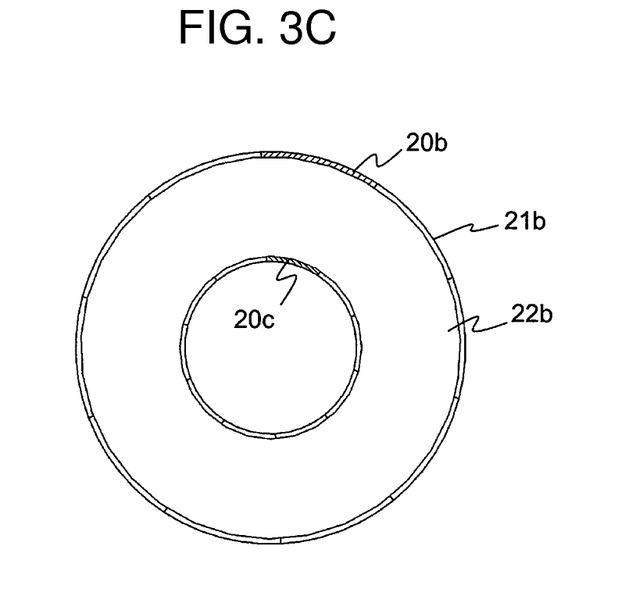
FIG. 3C is a view of a permanent magnet and a yoke according to the third embodiment when seen in an axial direction of a rotation axis.

FIGS. 3(a) to 3(c) are views for explaining an example of application of the present invention to a double-rotor axial-type motor. The explanation for a structure, an operation, and an effect overlapped with those of FIGS. 1(a) to 1(e) and 2(a) to 2(c) will be omitted.

FIG. 3(a) is a perspective cross-sectional view of an axial-type rotary electric machine according to the present embodiment. FIG. 3(b) shows an enlarged cross-sectional view of a rotor according to the present embodiment. FIG. 3(c) shows a view of the permanent magnet and yoke when seen in the axial direction of the rotation axis.

In the rotor 20 of the present embodiment, the permanent magnet 21 has an inner diameter smaller than an inner diameter of the yoke 22, and therefore, has a second region 20c not overlapped with the yoke 22. In other words, when the permanent magnet 21 is projected along the axial direction of the rotation axis 30, the second region 20c where the projecting portion 21b of the permanent magnet 21 does not overlap the projecting portion 22b of the yoke 22 is formed in the permanent magnet 21. The second region 20c is formed on the inner-diameter side of the permanent magnet 21 and is therefore closer to the inner-diameter side than the first region 20b. Also, in comparison between a second portion 23f facing the second region 20c and the yoke facing portion 23e facing the yoke 22 in a thickness of the support member 23 with reference to an end surface of the yoke 22 on a not-facing side to the permanent magnet 21, a relation of "a thickness T2 of the support member 23 on the second portion 23f>a thickness Ty of the support member 23 on the yoke facing portion 23e" is established.

An effect of the axial-type motor of the present embodiment will be described. In the axial-type motor of the present embodiment, the permanent magnet 21 faces the support member 23 via the first region 20b and the second region 20c. The first region 20b and the second region 20c of the support member 23 are formed with a higher dimensional accuracy than the end surface of the yoke formed of a stacked electromagnetic steel sheet or others, and therefore, it is easy to control an angle of the permanent magnet 21 with respect to the rotation axis. Also, when the permanent magnet 21 is adhered thereto, a reliable bonding surface can be secured. Further, because the second portion 23f is thickened, the magnetic resistance can be reduced as similar to the second embodiment, and therefore, the torque and efficiency can be improved.

Fourth Embodiment

FIGS. 4(a) to 4(f) are views for explaining an example of application of the present invention to a double-rotor axial-type motor having one stator and two rotors.

Figure 4A:
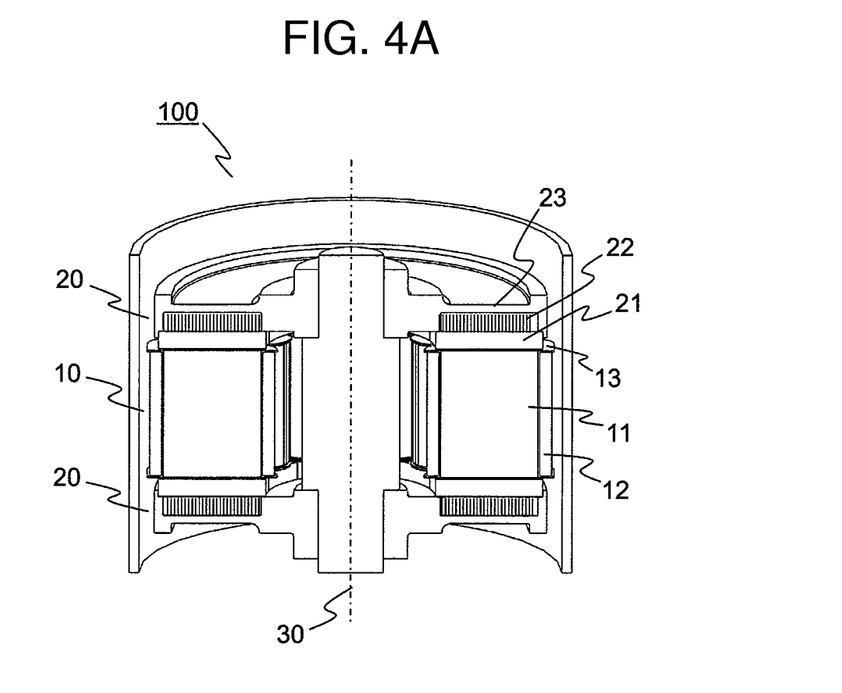
FIG. 4A is a perspective cross-sectional view of an axial-type rotary electric machine according to a fourth embodiment.
Figure 4B:
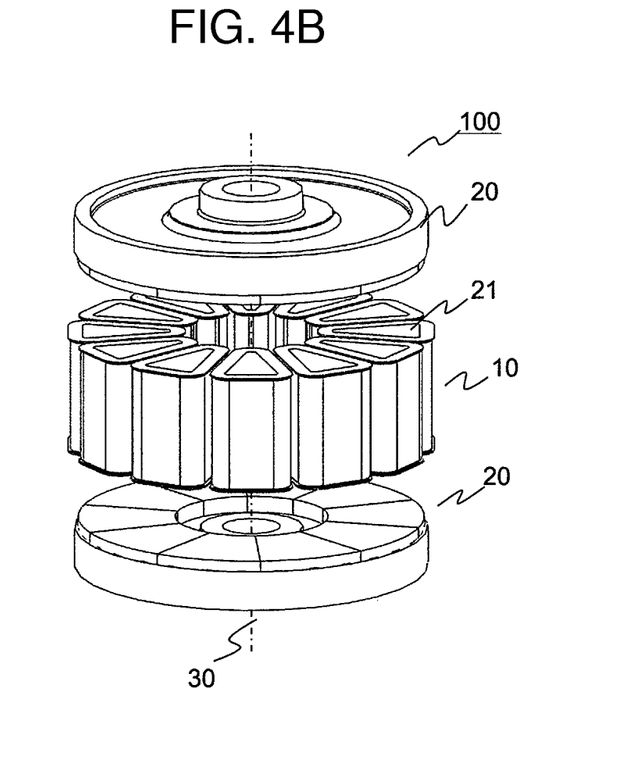
FIG. 4B is a perspective view of the axial-type rotary electric machine according to the fourth embodiment.

FIG. 4(a) shows a perspective cross-sectional view of a motor (axial-type rotary electric machine) according to the present embodiment, and FIG. 4(b) shows a perspective view of the motor according to the present embodiment.

The axial-type rotary electric machine 100 of FIG. 4(a) includes: a stator 10; rotors 20 arranged so as to sandwich the stator 10 via an air gap in a direction of a rotation axis 30 passing through the stator 10; a housing 40 used for holding the stator 10; and a shaft 50 used for holding the rotors 20 via bearings not shown. The rotors 20 face the stator 10 along the axial direction of the rotation axis 30.

In FIG. 4(b), illustration of the housing 40 and the shaft 50 is omitted. Also, the air gap is shown so as to be enlarged in order to understand the structure of the stator 10. The stator 10 includes: a plurality of circumferentially-arranged and soft-magnetic-used stator cores 11; a winding wire 12 wound around the stator cores 11; and a bobbin 13 electrically insulating the stator cores 11 from the winding wire 12. The stator cores 11, the winding wire 12, and the bobbin 13 are molded integrally with the housing 40 by using a resin. The rotor 20 is configured of the permanent magnet 21 arranged so as to face an end surface of each stator core 11 in the axial direction, a soft magnetic yoke 22 arranged on the back of the permanent magnet 21, and a support member 23 used for holding the permanent magnet 21 and the yoke 22 on the shaft 50 so as to support the yoke 22. The yoke 22 is arranged so as to face the stator core 11 across the permanent magnet 21. The support member 23 is fixed to the rotation axis 30.

Figure 4C:
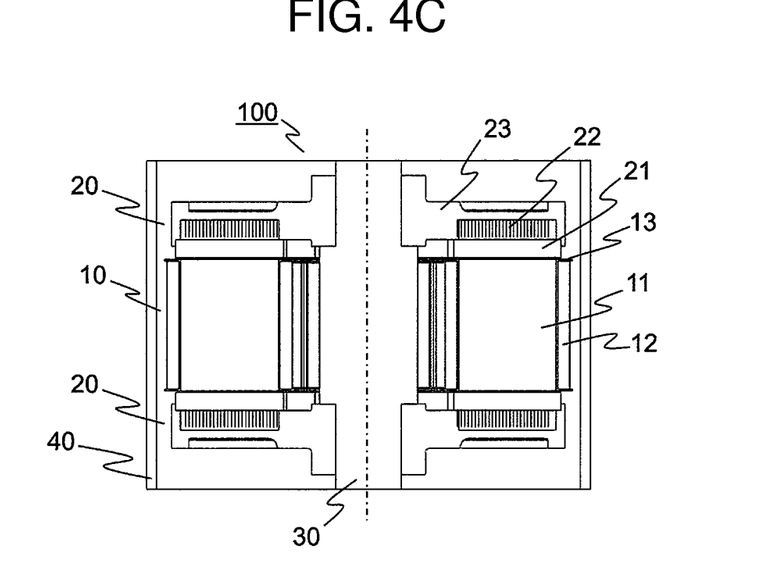
FIG. 4C is a cross-sectional view of the axial-type rotary electric machine according to the fourth embodiment.
Figure 4D:
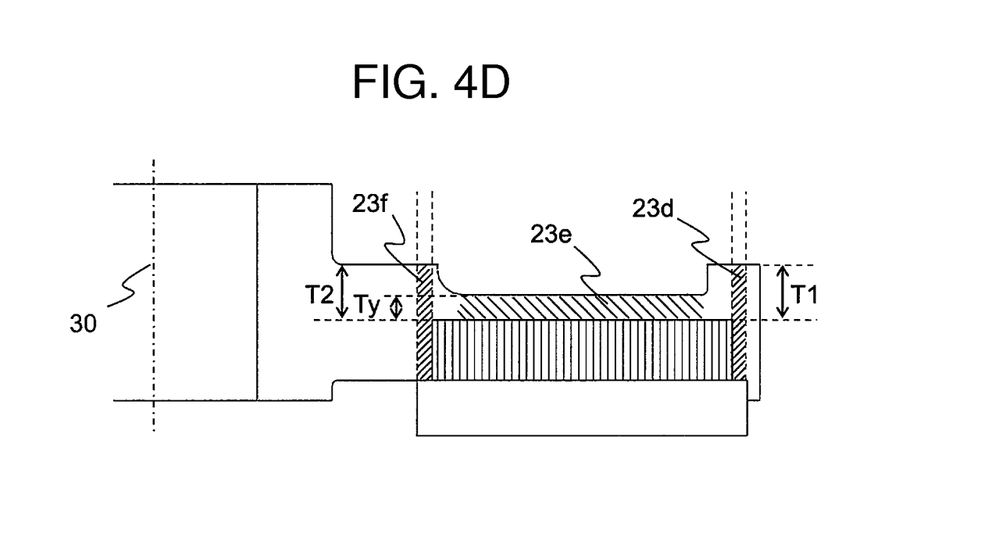
FIG. 4D is an enlarged cross-sectional view of a rotor according to the fourth embodiment.

FIG. 4(c) shows a cross-sectional view of the axial-type rotary electric machine according to the present embodiment. FIG. 4(d) shows an enlarged cross-sectional view of the rotor according to the present embodiment. The support member 23 has the protrusion 23c protruding so as to face a side surface 21a of a permanent magnet 21 arranged on the farther side to the rotation axis 30.

Figure 4E:
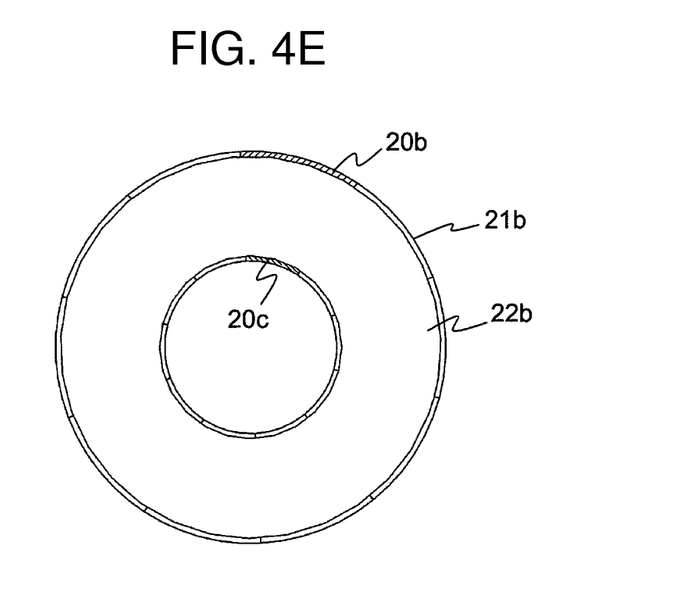
FIG. 4E is a view of a permanent magnet and a yoke according to the fourth embodiment when seen in an axial direction of a rotation axis.

FIG. 4(e) shows a view of the permanent magnet and the yoke when seen in the axial direction of the rotation axis. An outer diameter of the permanent magnet 21 is larger than an outer diameter of the yoke so as to have a first region 20b not overlapped with the yoke 22. Also, the permanent magnet 21 has an inner diameter smaller than an inner diameter of the yoke 22, and has the second region 20c not overlapped with the yoke 22.

Further, in a thickness of the support member 23 with reference to an end surface of the yoke 22 on a not-facing side to the permanent magnet 21, a relation of "a thickness T1 of the support member 23 on the first portion 23d>a thickness Ty of the support member 23 on the yoke facing portion 23e" is established in comparison between a first portion 23d facing the first region 20b and the yoke facing portion 23e facing the yoke 22, and a relation of "a thickness T2 of the support member 23 on the second portion 23f>a thickness Ty of the support member 23 on the yoke facing portion 23e" is established in comparison between a second portion 23f facing the second region 20c and the yoke facing portion 23e facing the yoke 22.

Figure 4F:
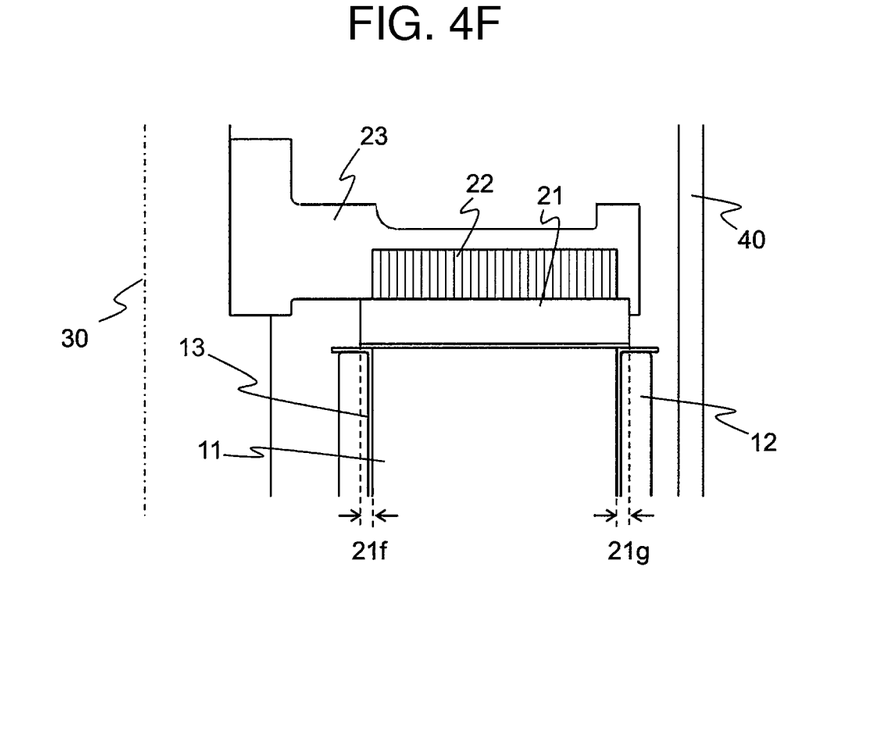
FIG. 4F is an enlarged view of peripheries of the permanent magnet and a stator core according to the fourth embodiment.

FIG. 4(f) is an enlarged view of peripheries of the permanent magnet and the stator core of the present embodiment. FIG. 4 (f) shows a difference 21f between the inner diameter of the permanent magnet 21 and the inner diameter of the stator core 11 and a difference 21g between the outer diameter of the permanent magnet 21 and the outer diameter of the stator core 11. In FIG. 4(f), in comparison between the diameter of the permanent magnet 21 and the diameter of the stator core 11, a relation of "an inner diameter of the permanent magnet 21<an inner diameter of the stator core 11" and a relation of "an outer diameter of the permanent magnet 21>an outer diameter of the stator core 11" are established.

The operation of the axial-type motor of the present embodiment will be described. Here, an operation example of the motor will be described. The winding wire is electrically conducted with an alternating current by using an inverter or an alternating-current power supply not shown. As a result, an alternating magnetic field is generated on the surface of the stator. This alternating magnetic field and a dielectric-current magnetic field generated by the permanent magnet attract to and repel against each other, so that the rotor is rotated so as to generate a torque. Also, by the rotation, a centrifugal force acts on the rotor outward in its radial direction.

An effect of the axial-type motor of the present embodiment will be described. In the axial-type motor of the present invention, the permanent magnet 21 and the yoke 22 are held by the protrusion 23c of the support member 23 from the outer periphery side, and therefore, the permanent magnet 21 and the yoke 22 can be suppressed from being scattered.

Also, by forming the first region 20b, the radial thickness of the protrusion 23c used for holding the permanent magnet 21 can be reduced as the strength of the protrusion 23c against the centrifugal force is maintained. In this manner, the increase in the diameter of the rotor 20 due to the protrusion 23c can be suppressed to the minimum. A ratio of the diameter of the permanent magnet 21 with respect to the diameter of the rotor 20 can be increased, and therefore, a high torque of the motor and a high efficiency thereof can be achieved. Because the diameter of the rotor 20 can be reduced, the diameter of the housing 40 can be reduced, a crossover wire of the winding wire or others can be arranged between the outer peripheral surface of the rotor 20 and the housing 40.

Also, the radial thickness of the protrusion 23c decreases, and therefore, a flow property of a material in casting of the support member 23 is good, and a manufacturing performance is also excellent. The support member 23 may be made of a soft magnetic material or non-magnetic material.

By forming the second region 20c, the permanent magnet 21 can face the support member 23 via the first region 20b and the second region 20c. The first region 20b and the second region 20c of the support member 23 are formed with a higher dimensional accuracy than the end surface of the yoke formed of a stacked electromagnetic steel sheet or others, and therefore, it is easy to control an angle of the permanent magnet 21 with respect to the rotation axis 30. Also, when the permanent magnet 21 is adhered thereto, a reliable bonding surface can be secured.

Also, the thicknesses of the support members 23 on the first portion 23d and the second portion 23f are increased, and therefore, when the support member 23 is made of a soft magnetic material, a magnetic resistance of a magnetic circuit can be reduced. When the support member 23 is made of a non-magnetic material, magnetic flux emitted from a magnetic pole where the permanent magnet 21 exists passes through the soft magnetic yoke 22 and enters an adjacent magnetic pole. On the other hand, when the support member 23 is made of a soft magnetic material, the support member 23 also forms a magnetic circuit particularly centering on the first region 20b and the second region 20c. Particularly when the yoke 22 is thinned in order to thin the rotor 20, a magnetic flux density of the yoke 22 increases, which results in increase in a magnetic resistance of the yoke 22, and therefore, the magnetic flux is easy to pass through the first region 20b and the second region 20c. At this time, iron making up the support member 23 has a lower magnetic permeability and is easier to be magnetically saturated than an electromagnetic steel sheet generally making up the yoke 22. Accordingly, by thickening the first portion 23d and the second portion 23f as described in the present embodiment, the amount of magnetic flux leaking out of the magnetic circuit, so that the output torque and efficiency of the motor is improved.

In addition, the amount of the magnetic flux of the permanent magnet 21 is increased by overhanging the permanent magnet 21 so that "the inner diameter of the permanent magnet 21<the inner diameter of the stator core 11" and "the outer diameter of the permanent magnet 21>the outer diameter of the stator core 11", and therefore, the torque and efficiency of the motor can be improved.

As a preferable material combination for the motor of the present invention, a combination of usage of a ferrite magnet for the permanent magnet and usage of an amorphous metal for the stator core is cited. The ferrite magnet is inferior in magnetic force to a neodymium magnet and a samarium-cobalt magnet. In order to support the inferiority in the magnetic force, it is desired to use the magnet so as to expand a surface area and increase a thickness. By application of the present embodiment, the diameter of the ferrite magnet can be increased as increase in the diameter of the rotor is suppressed. Also, the amorphous metal is a soft magnetic material with high permeability and small loss. The usage of the amorphous metal in combination with the neodymium magnet has a disadvantage point of the low saturation magnetic flux density. However, the saturation magnetic flux density is sufficient for the ferrite magnet. By using the ferrite magnet so as to be overhung, the magnetic flux can be utilized more effectively.

In the present embodiment, the example of the application of the present invention to the double-rotor axial-type motor has been described. However, the present invention may be also applied to a single-rotor axial-type motor having a pair of a stator and a rotor facing each other. Also, the motor may be replaced with a generator.

Also, in the present embodiment, the ring-shaped permanent magnet has been described. However, the magnet may be divided.

Fifth Embodiment

Figure 5:
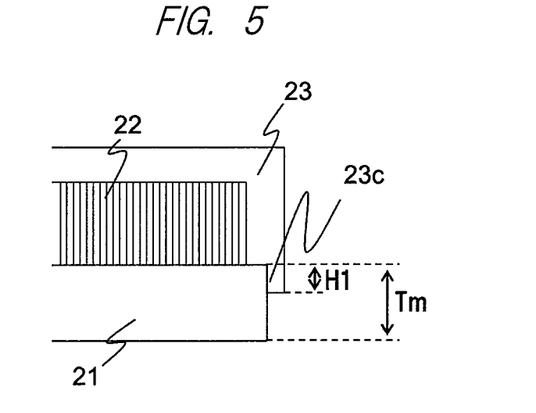
FIG. 5 is an enlarged cross-sectional view of a protrusion of a support member according to a fifth embodiment.

FIG. 5 is a view for explaining an example of application of the present invention to an axial-type motor. The explanation for a structure, an operation, and an effect overlapped with those of FIGS. 1(a) to 1(e), 2(a) to 2(c), 3(a) to 3(c), and 4(a) to 4(f) will be omitted.

FIG. 5 is an enlarged view of the periphery of the protrusion of the support member of the motor according to the present embodiment. It is desired that a height H1 of the protrusion 23c facing an outer peripheral surface of the permanent magnet 21 be equal to or smaller than 50% of the thickness Tm of the permanent magnet 21, more specifically, be about 20% (equal to or larger than 15% but equal to or smaller than 25%, more preferably, equal to or larger than 18% but equal to or smaller than 22%). A reaction force from the protrusion 23c acts on the outer peripheral surface of the permanent magnet 21. The large height H1 can decrease a surface pressure applied to the permanent magnet 21, and therefore, breakage due to the centrifugal force can be suppressed. On the other hand, the small height H1 can suppress the magnetic flux leakage to the protrusion 23c. About 20% is obtained by a result of the maximum height H1 that can sufficiently suppress the magnetic flux leakage.

An effect of the axial-type motor of the present embodiment will be described. By setting the height of the protrusion 23c to the above-described dimension, the amount of the magnetic flux leakage from the permanent magnet 21 to the protrusion 23c can be reduced, so that the torque and efficiency of the motor can be improved.

SYMBOL EXPLANATION

10 . . . stator
11 . . . stator core
12 . . . winding wire
20 . . . rotor
20b . . . first region
20c . . . second region
21 . . . permanent magnet
21a . . . side surface of permanent magnet
21b . . . projection portion of permanent magnet
22 . . . yoke
22b . . . projection portion of yoke
23 . . . support member
23c . . . protrusion
23d . . . first portion
23e . . . yoke facing portion
23f . . . second portion
30 . . . rotation axis
40 . . . housing
50 . . . shaft
100 . . . axial-type rotary electric machine

The invention claimed is:

1. An axial-type rotary electric machine comprising:
a stator having a stator core; and
a rotor facing the stator along an axial direction of a rotation axis passing through the stator,
wherein the rotor includes:
a permanent magnet arranged so as to face the stator core in the axial direction of the rotation axis;
a yoke arranged so as to face the stator core across the permanent magnet; and
a support member supporting the yoke,
the support member includes:
a protrusion protruding so as to face a side surface of the permanent magnet that is on a farther side to the rotation axis,
the permanent magnet includes a first region where a first end portion of the permanent magnet extends radially outward farther than a first end portion of the yoke, the first region is formed on an outer-diameter side of the permanent magnet, the first region is formed on a side of the protrusion, and a thickness of a first portion of the support member is larger than a thickness of a yoke facing portion of the support member; and wherein a radially outermost end of the support member includes a portion that projects in the axial direction away from the permanent magnet.

2. The axial-gap-type rotary electric machine according to claim 1, wherein the permanent magnet includes a second region where a second end portion of the permanent magnet extends radially inward farther than a second end portion of the yoke, and the second region is formed on an inner-diameter side of the permanent magnet.

3. The axial-gap-type rotary electric machine according to claim 2, wherein the support member has a second portion facing the second region, and a thickness of the support member on the second portion is larger than said thickness of the yoke facing portion of the support member.

4. The axial-type rotary electric machine according to claim 1, wherein an inner diameter of the permanent magnet is smaller than an inner diameter of the stator core, and an outer diameter of the permanent magnet is larger than an outer diameter of the stator core.

5. The axial-type rotary electric machine according to claim 1, wherein a height of the protrusion facing an outer peripheral surface of the permanent magnet is equal to or smaller than 50% of a thickness of the permanent magnet.

6. The axial-type rotary electric machine according to claim 1, wherein a height of the protrusion facing an outer peripheral surface of the permanent magnet is equal to or larger than 15% and equal to or smaller than 25% of a thickness of the permanent magnet.

7. The axial-type rotary electric machine according to claim 1, wherein a ferrite is used for the permanent magnet, and an amorphous metal is used for the stator core.

* * * * *